(12) United States Patent  
Carnick et al.

(10) Patent No.: US 9,842,718 B1
(45) Date of Patent: Dec. 12, 2017

(54) FUSE ARRAY FOR VEHICLE ELECTRICAL SYSTEM HAVING MULTIPLE DISCRETE CIRCUITS

(71) Applicant: Sumitomo Wiring Systems, Ltd., Yokkaichi, Mie (JP)

(72) Inventors: Brian Carnick, New Baltimore, MI (US); Bennie James Malcom, Detroit, MI (US)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/179,582

(22) Filed: Jun. 10, 2016

(51) Int. Cl.
*H01H 85/02* (2006.01)

(52) U.S. Cl.
CPC ... *H01H 85/0241* (2013.01); *H01H 2085/025* (2013.01)

(58) Field of Classification Search
CPC ............... H01H 85/0241; H01H 2085/025
USPC ......................................................... 337/227
See application file for complete search history.

(56) References Cited

U.S. PATENT DOCUMENTS

| | | | | |
|---|---|---|---|---|
| 5,731,944 A * | 3/1998 | Yasukuni | ............... | H01H 85/20 361/104 |
| 6,280,253 B1 * | 8/2001 | Kraus | .................. | H01R 9/2458 439/594 |
| 6,545,861 B1 * | 4/2003 | Hayes | ..................... | H02B 1/48 174/536 |
| 6,558,198 B2 * | 5/2003 | Kobayashi | ......... | H01H 85/0417 337/290 |
| 6,815,841 B1 * | 11/2004 | Brown | ................ | H01H 85/046 307/10.1 |
| 7,236,893 B2 * | 6/2007 | Gross | .................... | H02J 7/1423 320/104 |
| 7,504,926 B2 * | 3/2009 | Bessho | ............. | H01H 85/2035 337/189 |
| 7,592,892 B2 * | 9/2009 | Ito | ........................ | H01H 85/045 337/159 |
| 7,663,465 B2 * | 2/2010 | Matsumoto | .......... | H01H 85/044 337/187 |
| 8,130,070 B2 * | 3/2012 | Shibata | ............... | H01H 85/044 29/623 |
| 8,665,056 B2 * | 3/2014 | Urrea | .................... | H01H 85/12 337/188 |
| 9,484,175 B2 * | 11/2016 | Onoda | .................. | H01H 85/10 |
| 2004/0256710 A1 | 12/2004 | Schwarzbauer | | |

(Continued)

FOREIGN PATENT DOCUMENTS

JP          2014128073 A          7/2014

*Primary Examiner* — Anatoly Vortman
(74) *Attorney, Agent, or Firm* — Reising Ethington, P.C.

(57) ABSTRACT

A fuse array for use in a vehicle electrical system having more than one battery, such as in a start-stop vehicle that automatically shuts off an engine when the vehicle comes to a stop and automatically restarts the engine when a driver starts driving again. The fuse array includes first and second discrete circuits, where the discrete circuits include their own internal bus bars and are electrically isolated from one another, even though they are part of the same fuse array. This enables the fuse array to independently provide battery power to different downstream electrical components, such as a power distribution device and various high amperage components, while still utilizing a single compact assembly.

18 Claims, 5 Drawing Sheets

(56) References Cited

U.S. PATENT DOCUMENTS

2013/0229752 A1\* 9/2013 Takahashi .............. H01H 85/20
361/642

\* cited by examiner

FUSE ARRAY FOR VEHICLE ELECTRICAL SYSTEM HAVING MULTIPLE DISCRETE CIRCUITS

FIELD

The present invention relates generally to a fusible component for a vehicle electrical system and, more particularly, to a fuse array with multiple discrete circuits for a vehicle electrical system having multiple batteries, such as those used in start-stop vehicles.

BACKGROUND

Conventional fuse arrays for vehicle electrical system components, such as fuse array 120 illustrated in FIG. 9, typically have a single discrete circuit for current to flow through. Battery power, or B+ power as it is also known, is provided to the fuse array 120 by a low voltage battery (not shown) via battery power terminal 122. Current associated with the B+ power flows within a conductive bus bar 124 and then branches out via individual fuses (not shown), which are separately connected to a junction box terminal 128 and several high current terminals 130. The junction box terminal 128 connects the fuse array 120 to a bus bar 140, which in turn is connected to a downstream component in the form of a junction box (not shown). The high current terminals 130 connect the fuse array 120 to various high current devices in the vehicle electrical system. Skilled artisans will appreciate that the current paths within the fuse array 120 are protected from current surges by the different individual fuses, but that the fuse array only has a single discrete circuit.

Some vehicles, like certain start-stop vehicles, have two separate batteries where each battery separately provides B+ power to the vehicle electrical system. For multiple battery applications like this, it may be desirable to provide a single fuse array that includes multiple discrete circuits so that B+ power can be provided from both batteries to the components of choice through a single fusible component.

SUMMARY

According to one aspect, there is provided a fuse array for use in a vehicle electrical system having first and second vehicle batteries. The fuse array may comprise: an insulative housing; a first discrete circuit for providing battery power from the first vehicle battery to a first downstream component, the first discrete circuit includes a first internal bus bar secured on the outside of the insulative housing and a first fuse contained within the insulative housing; and a second discrete circuit for providing battery power from the second vehicle battery to a second downstream component, the second discrete circuit includes a second internal bus bar secured to the outside of the insulative housing. The first and second discrete circuits are electrically isolated from one another within the fuse array so that the first discrete circuit can provide battery power from the first vehicle battery to the first downstream component and the second discrete circuit can independently provide battery power from the second vehicle battery to the second downstream component.

DRAWINGS

Preferred exemplary embodiments of the invention will hereinafter be described in conjunction with the appended drawings, wherein like designations denote like elements, and wherein.

DESCRIPTION

The fuse array described herein is a fusible component with multiple discrete circuits and is designed for use in a vehicle electrical system having more than one battery. The fuse array may be incorporated within or used in conjunction with any number of different vehicle electrical system components, such as a pre-fuse assembly or a power distribution device like a power distribution center (PDC), a vehicle electrical center (VEC), a power distribution box (PDB), an electrical connection box, a junction box assembly, etc.

According to one non-limiting example, the fuse array described herein is connected to a power distribution device that is part of a 'start-stop vehicle' that automatically shuts off the internal combustion engine when the vehicle comes to a stop and automatically restarts the engine when the driver starts driving again (e.g., when the driver lifts off of a brake pedal or engages a clutch pedal). By shutting off the engine while the vehicle is idling and resuming only when the driver is ready to start driving, the start-stop vehicle is able to improve fuel economy and decrease emissions. Some start-stop vehicles employ two batteries: a first low voltage battery (e.g., a 12 v lead-acid or other battery for starting the engine and providing power to certain accessories), and a second low voltage battery (e.g., a 12 v lithium-ion battery for storing regenerative braking charge and assisting with power and load management). The fuse array described herein provides multiple discrete circuits within a single assembly, where a first discrete circuit can connect the first low voltage battery to downstream components and a second discrete circuit can connect the second low voltage battery to different downstream components.

It should be appreciated that while the fuse array is not limited to use with start-stop vehicles and may be used in a number of other applications, the multiple discrete circuits of the present fuse array make it particularly well suited for systems having multiple batteries, like those sometimes employed by start-stop vehicles, electric vehicles or hybrid electric vehicles, to cite a few possibilities. The fuse array of the present invention is not limited to the examples described herein, as they are simply provided to illustrate different potential embodiments and features of the fuse array.

Figure 1:
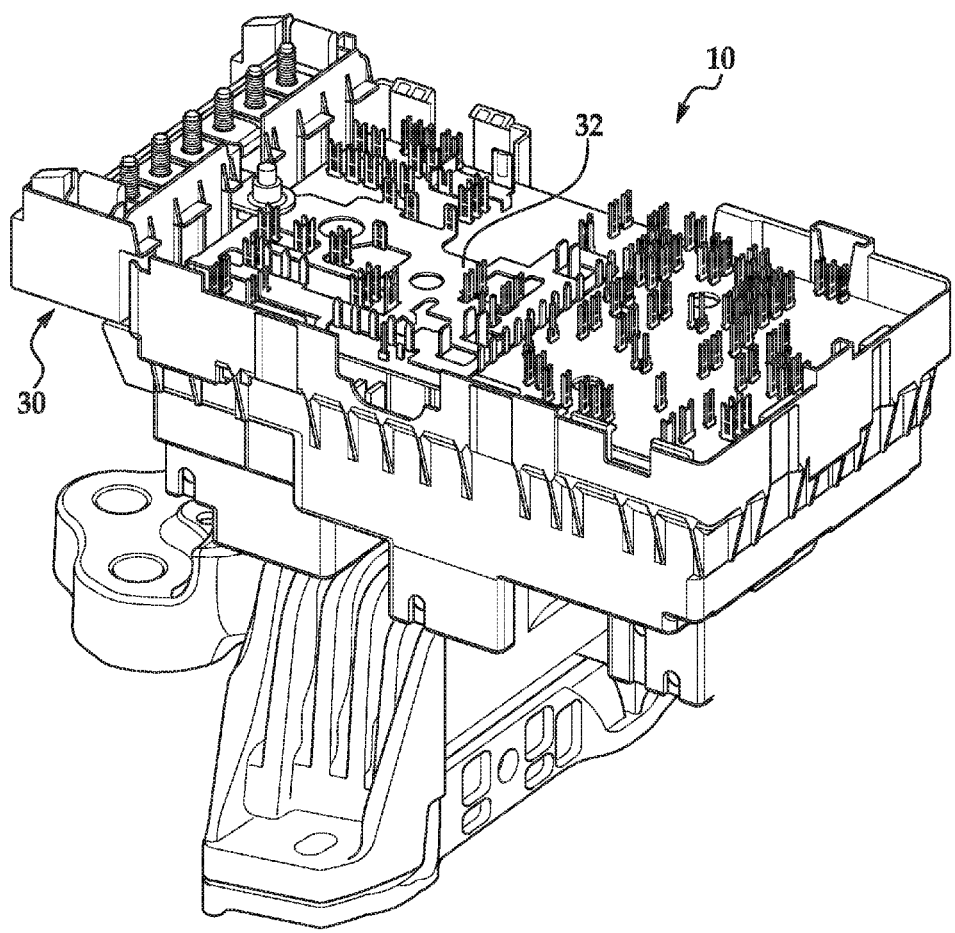
FIG. 1 is a perspective view of an exemplary power distribution device, in this case a power distribution center (PDC), that includes an exemplary embodiment of a fuse array.

Beginning with FIG. 1, there is shown a non-limiting example of a power distribution device 10 for a vehicle, in this case a power distribution center (PDC), connected to a fuse array 30. Those skilled in the art will appreciate that the power distribution device 10 may provide for compact and efficient power distribution within a vehicle's electrical system, including power distribution for lower and higher amperage components. As shown in FIG. 1, the fuse array 30 is physically and electrically connected to a bus bar 32 which is part of the power distribution device 10 so that power may be provided from a first battery (not shown), through the fuse array 30, and to the power distribution device 10 via bus bar 32. Other arrangements are certainly possible.

Figure 2:
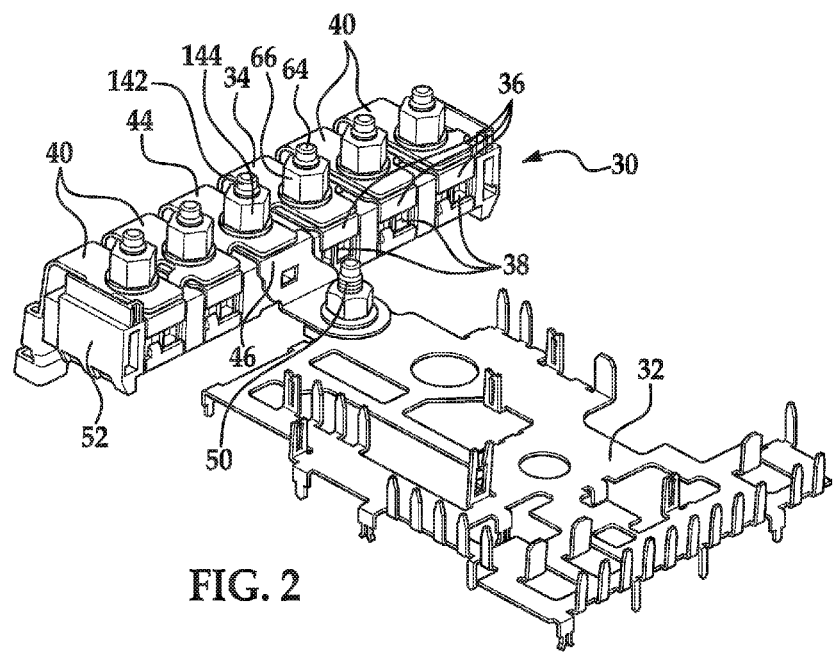
FIGS. 2 and 3 are perspective views of the fuse array of FIG. 1, where the fuse array is shown connected to a bus bar within the power distribution device.
Figure 3:
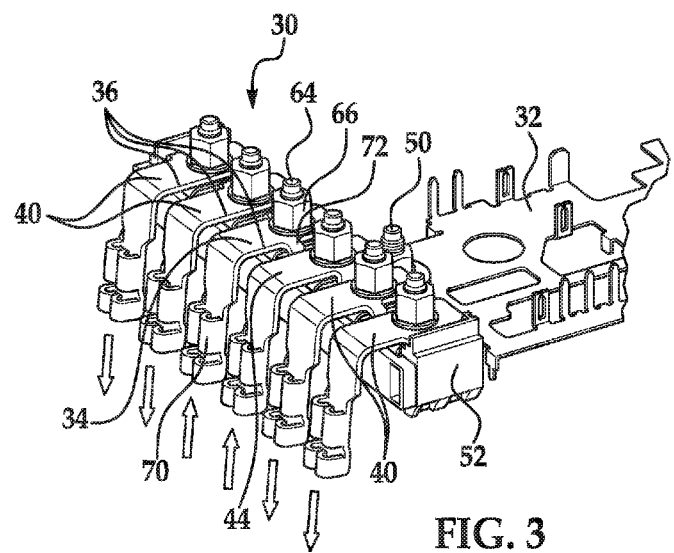

Turning now to FIGS. 2 and 3, there are shown several enlarged perspective views of the fuse array 30, where the fuse array is still connected to the separate bus bar 32 that is part of the power distribution device 10. The fuse array 30 is a fusible component that protects certain downstream electrical devices within the vehicle electrical system from current surges and, according to this example, includes a first battery terminal 34, a first internal bus bar 36, a set of first fuses 38, a set of first output terminals 40 (components 34-40 constitute a first discrete circuit 56), a second battery terminal 44, a second internal bus bar 46, a second output terminal 50 (components 44-50 constitute a second discrete circuit 58), and an insulative housing 52. The first discrete circuit 56 receives B+ power from a first vehicle battery through the first battery terminal 34 and then distributes that power via the first internal bus bar 36, the set of first fuses 38, and the set of first output terminals 40. Whereas the second discrete circuit 58 receives B+ power from a second vehicle battery through the second battery terminal 44 and conveys that power via the second internal bus bar 46 and the second output terminal 50.

These two circuits 56, 58 are discrete and electrically isolated from one another, despite the fact that they both flow through the same fuse array 30. According to the embodiment described below, the first discrete circuit includes four different branches or current paths, each of which includes a different output terminal 40 that provides a different downstream component with B+ power. Thus, the first discrete circuit 56 is connected to a common battery and is at a common shared voltage, but may include a plurality of individual branches or current paths connected to different downstream components. According to that same embodiment, the second discrete circuit 58 only has one output terminal and, thus, only includes one branch or current path. In the example where the second discrete circuit 58 is connected to the power distribution center (PDC) 10 that has its own fuses, relays, etc., the second discrete circuit would not need to be fused itself (this explains why only the first discrete circuit 56 in the preceding embodiment includes a set of fuses). It is possible for discrete circuits 56, 58 to be at the same voltage (e.g., they could both be part of 12 v or 42 v systems) or they could be at different voltages (e.g., circuit 56 could be part of a 12 v system while circuit 58 is part of a 42 v system). Other examples are also possible.

First battery terminal 34 is an input terminal that is connected to a first vehicle battery and corresponding battery cable (not shown) so as to provide battery power or B+ power to the fuse array 30, and it is bolted down on the fuse array using a terminal stud 64 and terminal nut 66. As best illustrated in FIG. 3, the first battery terminal 34 may include a cable retaining feature 70 at one end that crimps around and retains a terminal end of the battery cable and a fuse relay mounting feature 72 at the other end that wraps around and fits over top of a portion of the first internal bus bar 36.

Those skilled in the art will appreciate that there are a number of potential battery terminal designs and configurations and that the first battery terminal 34 is not limited to the exemplary one shown in FIGS. 2 and 3, as that is just one possibility.

Figure 6:
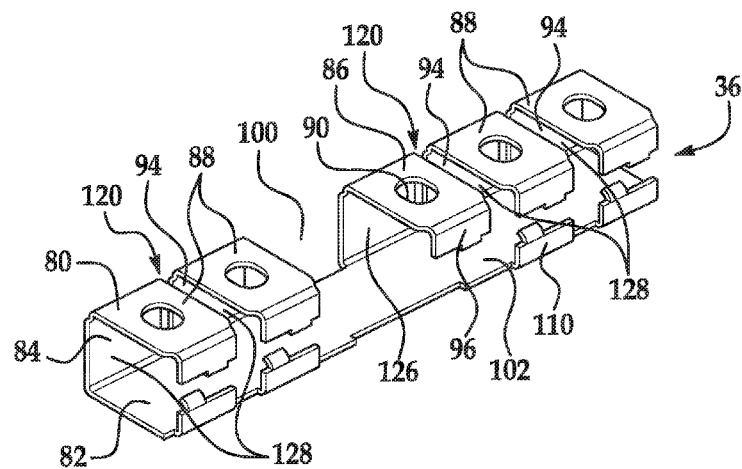
FIG. 6 is a perspective view of a bus bar that is part of the fuse array of FIGS. 2 and 3.

First internal bus bar 36 conveys and/or distributes B+ power within the first discrete circuit 56 and, according to one embodiment, provides for several different branches or current paths. According to the embodiment best shown in FIG. 6, the first internal bus bar 36 is made of a conductive metal, such as copper or a copper alloy, and includes a terminal side 80 (top horizontal side in FIG. 6), an opposing base side 82 (bottom horizontal side) and a connecting side 84 (back vertical side) that connects the terminal and base sides together. When viewed from the side, the first internal bus bar 36 has a somewhat C-shaped configuration. It is apparent from the drawings that the first internal bus bar 36 has an open slot 100 towards the middle of the bus bar so as to accommodate the second internal bus bar 46, as will be explained in more detail.

Terminal side 80, according to one embodiment, is a top horizontal side of the first internal bus bar 36. The terminal side includes a number of separate terminal connection portions 86, 88, where terminal connection portion 86 is configured to receive the first battery terminal 34, terminal connection portions 88 are designed to receive the set of first output terminals 40, and the open slot 100 has no terminal connection portion. Because of their similarity, only the terminal connection portion 86 is described below with the understanding that the description generally applies to the other terminal connection portions 88 as well. Each of the terminal connection portions 86, 88 has a hole or opening 90 that is sized and shaped to receive a terminal stud 64 so that the stud can be secured with a corresponding terminal nut 66, as previously explained. Because the terminal side 80 has thin slots or spaces 94 separating the different terminal connection portions 86, 88 from one another, electrical current cannot pass directly from one terminal connection portion to the next. This slotted arrangement helps form the different branches or current paths mentioned above, as will be subsequently described in more detail. At a distal end of each of the terminal connection portions 86, 88, there is a turned flange 96 that is bent at approximately 90° so as to extend downwards towards the opposing base side 82. The size and configuration of the terminal connection portions 86, 88, including the turned flanges, are designed to help the first internal bus bar 36 fit around and grasp the insulative housing 52.

Base side 82 is a bottom side of the first internal bus bar 36 and, according to the illustrated embodiment, spans the entire length of the bus bar. The base side 82 includes a number of turned flanges 110, which like their counterparts that extend from the upper terminal side 80, are bent at approximately 90° and are designed to help grasp and maintain the insulative housing 52 within the first internal bus bar. In order to better accommodate the second internal bus bar 46, the turned flange that would normally oppose the terminal connection portion 86 may be removed, as seen with the missing flange 102 in FIG. 6. This is not required, but it may be useful in providing better clearance for the different components of the fuse array.

Connecting side 84 acts as a side wall for the first internal bus bar 36 and physically and electrically connects the terminal side 80 to the base side 82. Like the terminal or top side 82, the connecting side 84 includes a number of individually slotted side connection portions 126, 128 that are separated from one another by thin slots or spaces 120 that extend in the vertical direction. Again, this separated or slotted arrangement helps facilitate the individual current branches or paths that are part of the first discrete circuit 56. Side connection portion 126 is physically connected to terminal connection portion 86 and helps provide B+ power to the rest of the internal bus bar 36, whereas side connection portions 128 are physically connected to terminal connection portions 88 and help establish the different current paths. As is clearly illustrated in FIG. 6, the open slot 100 that accommodates the second internal bus bar 46 creates an opening or void in the connecting side 84. This arrangement and its purpose will become more apparent as the fuse array is further explained.

Figure 5:
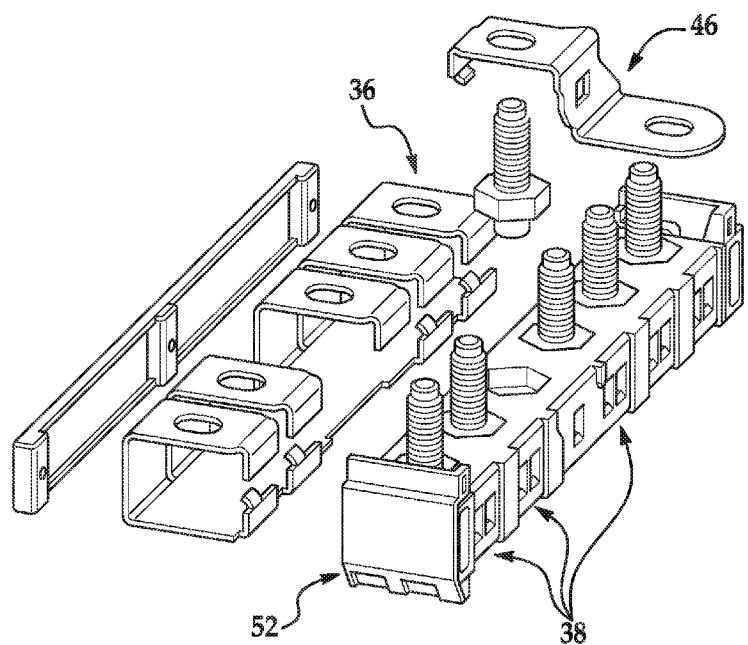
FIG. 5 is an exploded perspective view of the fuse array of FIGS. 2 and 3.

First set of fuses 38 are designed to protect downstream electrical components from current surges, such as those that could damage an alternator or a radiator fan, and are part of the first discrete circuit 56. Skilled artisans will appreciate that a number of different types of fusible components could be used with the first set of fuses 38. According to an exemplary embodiment, the first set of fuses 38 includes several individual fusible links, one for each of the different current branches within the first discrete circuit. As best illustrated in FIG. 5, the insulative housing 52 includes several different chambers or compartments and inside of each chamber is a fusible link that is part of a different current path. For example, a first current path that provides an alternator with B+ power would have a first fusible link designed to handle suitable current for an alternator (e.g., 40 amps), and a second current path that powers a radiator fan would have a second fusible link designed to handle typical radiator fan amperage (e.g., 30 amps). The preceding examples of high amperage devices are merely intended to illustrate the concept of providing a first set of fuses 38 with specifically selected fusible links based on the downstream components that they are intended to protect; the present invention is not limited to such examples.

First set of output terminals 40 connect to various downstream electrical components in order to provide them with B+ power. Referring back to FIG. 3, there are shown four separate output terminals 40 which are somewhat similar in design to the first battery terminal 34 described above. Each of the output terminals 40 includes a cable retaining feature and a fuse relay mounting feature and is secured to the first internal bus bar 36 using a terminal stud and nut; because of their similarity with features 64, 66, 70, 72 described above, which share the same names, the previous description applies here as well.

According to the present embodiment, the first battery terminal 34, the first internal bus bar 36, the set of first fuses 38, and the set of first output terminals 40 constitute the first discrete circuit 56. Within that discrete circuit, there are four separate branches or current paths, one for each of four downstream electrical components that require B+ power. The description now turns to the second discrete circuit 58, which is electrically isolated from the first discrete circuit 56 and is designed to separately power a downstream component like a power distribution box (not shown).

Second battery terminal 44 is very similar to the first battery terminal 34, except that it connects a battery cable from a second vehicle battery (not shown) to the second internal bus bar 46. The B+ power provided by the second vehicle battery may be at the same voltage or a different voltage from that supplied by the first battery.

Figure 7:
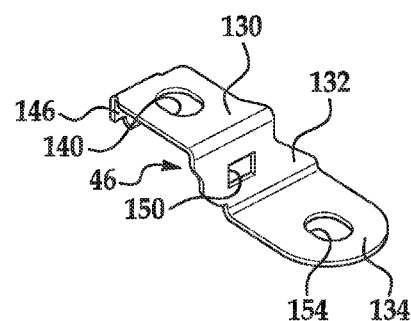
FIG. 7 is a perspective view of an additional bus bar that is part of the fuse array of FIGS. 2 and 3.

Second internal bus bar 46 may distribute power within the fuse array, similar to the first internal bus bar 36, but it is much smaller and different in configuration. With reference to FIG. 7, the second internal bus bar 46 may be made of copper or a copper-based alloy and includes a terminal connection portion 130, an intermediary portion 132, and an output connection portion 134. In the particular embodiment shown in the figures, the second internal bus bar 46 is part of the second discrete circuit 58, which connects to a power distribution box or some other electrical distribution device that has its own fuses, relays, etc.; thus, the second discrete circuit does not need to be fused, which explains why bus bar 46 directly connects B+ power to the separate bus bar 32 without first passing through a fusible component. Of course, it is possible for the second discrete circuit 58 to have a fusible component.

Figure 4:
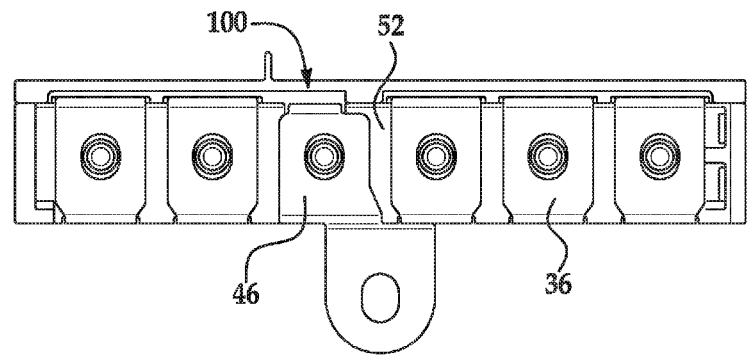
FIG. 4 is a plan view of the fuse array of FIGS. 2 and 3.

Terminal connection portion 130 fits over top of the insulative housing 52 and includes a hole or opening 140 for receiving a terminal stud and nut 142, 144 (FIG. 2), and it includes a turned flange 146 that is generally bent downwards so as to engage and latch onto the housing 52 when the fuse array is assembled. An illustration of an assembled fuse array is shown in FIG. 4, where it can be seen that the second internal bus bar 46 is installed on the insulative housing 52 in the open slot 100.

Intermediary portion 132 joins portions 130 and 134 together and, according to one embodiment, is simply a bent side portion with a locking portion 150 in the form of an opening or window. The locking portion 150 is sized and shaped to receive some type of tang or tab on the insulative housing 52 so that the bus bar 46 and housing 52 can be mechanically secured to one another. The locking portion 150 is optional, however, as other means for securing these components together could be used instead.

Output connection portion 134 connects the second discrete circuit 58 to a downstream component, like bus bar 32 of a power distribution box, and may be configured in any number of suitable ways. For instance, the illustrated embodiment shows the output connection portion 134 having a hole or opening 154 for receiving the second output terminal 50 (e.g. a threaded stud and nut). Other embodiments are certainly possible.

Figure 8:
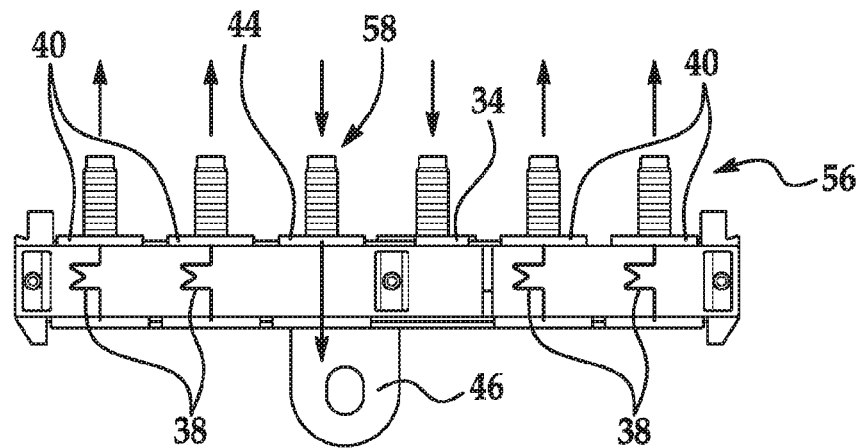
FIG. 8 is a schematic view of the fuse array of FIGS. 2 and 3, where current flow through the fuse array has been illustrated to show the multiple discrete circuits within the fuse array.
Figure 9:
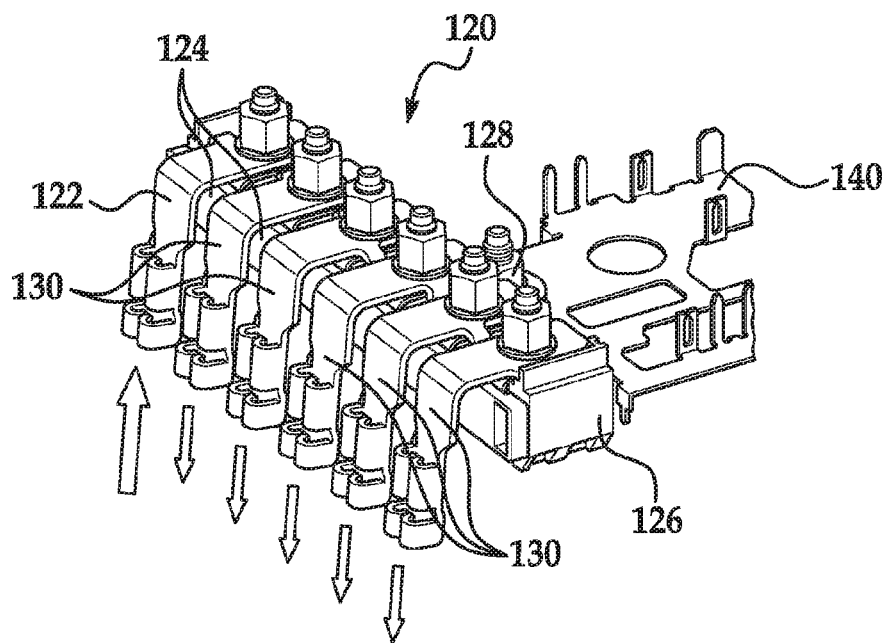
FIG. 9 is a perspective view of a conventional fuse array that has only a single discrete circuit.

Operation of the fuse array 30 is described in conjunction with the drawing in FIG. 8, which schematically illustrates the two discrete circuits 56, 58. Beginning with the first discrete circuit 56, B+ power is provided from a first vehicle battery, through the first battery terminal 34, and throughout the different current branches or paths in the first bus bar 36. As the battery power distributes in the various current branches, current flows through each of the fuses 38, out through the output terminals 40, and to the different high amperage downstream components, like an alternator or radiator fan. In this way, each current branch within the first discrete circuit 56 is individually or separately fused to protect against a current surge, even though all of the current branches are part of the same discrete circuit and are maintained at the same voltage. Turning now to the second discrete circuit 58, B+ power is provided from the second vehicle battery to the second battery terminal 44, from the second battery terminal to the second internal bus bar 46, and from the second internal bus bar to the output terminal 50, which may be connected to a power distribution box or the like. As explained above, power distribution devices oftentimes have their own collection of fuses, relays, etc., which explains why the current path within the second discrete circuit 58 is not independently fused or otherwise protected from current surges.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A fuse array for use in a vehicle electrical system having first and second vehicle batteries, the fuse array comprises:
   an insulative housing;
   a first discrete circuit for providing battery power from the first vehicle battery to a first downstream component, the first discrete circuit includes a first internal bus bar secured on the outside of the insulative housing and a first fuse contained within the insulative housing, the first internal bus bar is made of a conductive metal and includes a terminal side, a base side that opposes the terminal side, a connecting side that connects the terminal and base sides together, and an open slot; and
   a second discrete circuit for providing battery power from the second vehicle battery to a second downstream component, the second discrete circuit includes a second internal bus bar secured to the outside of the insulative housing, the second internal bus bar is accommodated in the open slot;
   wherein the first and second discrete circuits are electrically isolated from one another within the fuse array so that the first discrete circuit can provide battery power from the first vehicle battery to the first downstream component and the second discrete circuit can independently provide battery power from the second vehicle battery to the second downstream component.

2. The fuse array of claim 1, wherein the terminal side includes a plurality of terminal connection portions separated from one another by a plurality of thin slots, a first terminal connection portion is configured to receive battery power from a battery terminal coupled to the first vehicle battery and a second terminal connection portion is configured to provide battery power to an output terminal coupled to the first downstream component.

3. The fuse array of claim 2, wherein each of the plurality of terminal connection portions includes an opening that receives a terminal stud so that a corresponding terminal can be secured to the first internal bus bar with a terminal nut.

4. The fuse array of claim 2, wherein each of the plurality of terminal connection portions includes a turned flange that is bent at approximately 90° so as to help the first internal bus bar grasp onto the outside of the insulative housing.

5. The fuse array of claim 1, wherein the base side includes a plurality of turned flanges that are bent at approximately 90° so as to help the first internal bus bar grasp onto the outside of the insulative housing.

6. The fuse array of claim 5, wherein the base side includes a missing flange that is located between the plurality of turned flanges and cooperates with the open slot to accommodate the second internal bus bar.

7. The fuse array of claim 1, wherein the first discrete circuit includes a plurality of first fuses and a plurality of current branches, each of the plurality of first fuses is contained within the insulative housing and is part of an individually fused current branch.

8. The fuse array of claim 7, wherein the first discrete circuit with the plurality of current branches provides battery power from the first vehicle battery to a plurality of downstream components, including the first downstream component.

9. The fuse array of claim 1, wherein the first fuse includes a fusible link.

10. The fuse array of claim 1, wherein the second internal bus bar is made of a conductive metal and includes a terminal connection portion, an intermediary portion, and an output portion.

11. The fuse array of claim 10, wherein the terminal connection portion is configured to receive battery power from a battery terminal coupled to the second vehicle battery and the output portion is configured to provide battery power to an output terminal coupled to the second downstream component.

12. The fuse array of claim 11, wherein the terminal connection portion includes an opening that receives a terminal stud and a corresponding terminal is secured to the second internal bus bar with a terminal nut.

13. The fuse array of claim 10, wherein the intermediary portion is bent at approximately 90°, with respect to both the terminal connection portion and the output portion, and includes a locking portion that secures the second internal bus bar to the insulative housing.

14. The fuse array of claim 1, wherein the fuse array is configured to maintain the first discrete circuit at a first voltage and to independently maintain the second discrete circuit at a second voltage that is different than the first voltage.

15. The fuse array of claim 1, wherein the first discrete circuit includes a plurality of individually fused current branches and the second discrete circuit includes a single non-fused current branch, each of the plurality of individually fused current branches provides battery power from the first vehicle battery to a separate high amperage downstream component, and the single non-fused current branch provides battery power from the second vehicle battery to a power distribution box.

16. The fuse array of claim 1, wherein the fuse array is configured for use in a vehicle electrical system that is part of a start-stop vehicle that automatically shuts off an engine when the vehicle comes to a stop and automatically restarts the engine when a driver starts driving again.

17. A fuse array for use in a vehicle electrical system having first and second vehicle batteries, the fuse array comprises:
   an insulative housing;
   a first discrete circuit for providing battery power from the first vehicle battery to a first downstream component, the first discrete circuit includes a first internal bus bar secured on the outside of the insulative housing and a first fuse contained within the insulative housing; and
   a second discrete circuit for providing battery power from the second vehicle battery to a second downstream component, the second discrete circuit includes a second internal bus bar secured to the outside of the insulative housing, the second internal bus bar is Z-shaped, when viewed from a side, and sits on the outside of the insulative housing;

wherein the first and second discrete circuits are electrically isolated from one another within the fuse array so that the first discrete circuit can provide battery power from the first vehicle battery to the first downstream component and the second discrete circuit can independently provide battery power from the second vehicle battery to the second downstream component.

18. A fuse array for use in a vehicle electrical system having first and second vehicle batteries, the fuse array comprises:

an insulative housing;

a first discrete circuit for providing battery power from the first vehicle battery to a first downstream component, the first discrete circuit includes a first internal bus bar secured on the outside of the insulative housing and a first fuse contained within the insulative housing, the first internal bus bar is C-shaped, when viewed from a side, and at least partially wraps around the outside of the insulative housing; and a second discrete circuit for providing battery power from the second vehicle battery to a second downstream component, the second discrete circuit includes a second internal bus bar secured to the outside of the insulative housing;

wherein the first and second discrete circuits are electrically isolated from one another within the fuse array so that the first discrete circuit can provide battery power from the first vehicle battery to the first downstream component and the second discrete circuit can independently provide battery power from the second vehicle battery to the second downstream component.

* * * * *